US009738300B2

(12) United States Patent
Georgiev et al.

(10) Patent No.: US 9,738,300 B2
(45) Date of Patent: Aug. 22, 2017

(54) CARRYING APPARATUS

(71) Applicants: Yordan Georgiev, Las Vegas, NV (US); Iskra Hristova, Las Vegas, NV (US)

(72) Inventors: Yordan Georgiev, Las Vegas, NV (US); Iskra Hristova, Las Vegas, NV (US)

( * ) Notice: Subject to any disclaimer, the term of this patent is extended or adjusted under 35 U.S.C. 154(b) by 197 days.

(21) Appl. No.: 14/677,275

(22) Filed: Apr. 2, 2015

(65) Prior Publication Data
US 2016/0101801 A1 Apr. 14, 2016

Related U.S. Application Data

(60) Provisional application No. 62/122,110, filed on Oct. 14, 2014.

(51) Int. Cl.
*B62B 7/00* (2006.01)
*B62B 9/00* (2006.01)
*B62B 9/08* (2006.01)
*B62B 9/24* (2006.01)
*B62B 9/26* (2006.01)
*B62B 5/00* (2006.01)

(52) U.S. Cl.
CPC .............. *B62B 9/00* (2013.01); *B62B 5/0046* (2013.01); *B62B 5/0069* (2013.01); *B62B 9/085* (2013.01); *B62B 9/24* (2013.01); *B62B 9/26* (2013.01)

(58) Field of Classification Search
CPC B62B 9/08; B62B 9/00; B62B 5/0033; B62B 5/0069; B62B 7/042

USPC .......... 180/65.1, 907; 280/47.38, 304.1, 642, 280/643, 647, 648
See application file for complete search history.

(56) References Cited

U.S. PATENT DOCUMENTS

| | | | | |
|---|---|---|---|---|
| 5,873,425 A * | 2/1999 | Yang | ...................... | B62B 9/00 180/216 |
| 5,937,961 A * | 8/1999 | Davidson | .................. | B62B 9/00 180/166 |
| 6,360,836 B1 * | 3/2002 | Milano, Jr. | ............. | B62B 5/005 180/65.6 |
| 7,278,652 B2 * | 10/2007 | Riedl | ........................ | B62B 7/08 280/47.38 |
| 7,987,933 B1 * | 8/2011 | McClellan | ............... | B60K 1/00 180/65.1 |
| 2003/0132612 A1 * | 7/2003 | Pike | ....................... | A63B 24/00 280/642 |

(Continued)

*Primary Examiner* — Toan To

(57) ABSTRACT

A carrying apparatus provides a self-powered, rechargeable, technologically adaptable transport vehicle, such as a stroller. The apparatus includes efficient seating and storage capacities for efficiency items, such as pertinent baby supplies. Because the apparatus is self-powered, the physical stress of carrying at least one item is reduced. Furthermore, the apparatus uses technology to maintain perpetual power for operation, and to regulate and monitor the propulsion of the apparatus during transport. The apparatus may be pushed or pulled in multiple directions at varying velocities. The apparatus includes braking and accelerating capacities. A frame portion supports a seat portion, such as a buckled baby seat; a storage portion, such as a cargo mesh. A rechargeable power source powers a motor that turns a drive shaft for propulsion. Brakes position at the wheels. A control portion provides a display and levers for accelerating and decelerating.

19 Claims, 9 Drawing Sheets

(56) References Cited

U.S. PATENT DOCUMENTS

| | | | | |
|---|---|---|---|---|
| 2008/0042384 A1* | 2/2008 | Ferraioli | ............... | B62B 9/26 |
| | | | | 280/47.38 |
| 2009/0179394 A1* | 7/2009 | Huber | ............... | B62B 3/144 |
| | | | | 280/47.38 |
| 2013/0162396 A1* | 6/2013 | Yang | ............... | B60L 15/20 |
| | | | | 340/5.81 |
| 2013/0249202 A1* | 9/2013 | White | ............... | B62B 9/26 |
| | | | | 280/769 |
| 2013/0334781 A1* | 12/2013 | Mills | ............... | A63G 9/02 |
| | | | | 280/47.41 |
| 2015/0144411 A1* | 5/2015 | Washington | ............... | B62B 5/0076 |
| | | | | 180/167 |
| 2016/0101803 A1* | 4/2016 | Ahlemeier | ............... | B62B 9/08 |
| | | | | 180/167 |

* cited by examiner

CARRYING APPARATUS

CROSS-REFERENCE TO RELATED APPLICATIONS

The present Utility patent application claims priority benefit of the [U.S. provisional application for patent Ser. No. 62/122,110, filed on 2014 Oct. 14 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a carrying apparatus that is self-powered and controllable for facilitating the carrying of at least one item. More particularly, the invention relates to a carrying apparatus that is self-powered with a rechargeable power source and technologically adaptable for efficient seating and storage of a baby and baby related items.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that various methods of baby transport have been used across different cultures and periods and for different ages of child. Methods include wheeled devices including baby carriages, strollers, slings, backpacks, baskets, infant car seats, and bicycle carriers.

Typically, a baby stroller is a vehicle used to carry a baby. There are also special vehicles, car seats, and other devices for carrying babies. However, a baby stroller utilizes a wheeled frame with an infant seat secured thereon. The stroller frame is provided with a raised handle configured to allow a parent, family member or other attendant to manually push the stroller along as they walk.

In many instances, the stroller must be manually pushed by the attendant to propel it from one place to another. When pushing such a stroller on a long walk, even on smooth level pavement, such a task takes its toll and eventually becomes tiring to the person pushing the stroller. Typically, the infant seat is provided with a restraint device to prevent the infant or child from accidentally falling out of the seat. Wheel brakes or chocks can be used to stop the wheels from rolling.

In many instances, a motor and a drive shaft are effective for uniform acceleration of a vehicle. Levers and electrical components are often used to regulate velocity, power, and braking on the vehicle.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates a frontal view, and FIG. 2B illustrates a rear view, in accordance with an embodiment of the present invention;

FIG. 5A illustrates the control portion powered off, and FIG. 5B illustrates the control portion powered on with the display portion operational, in accordance with an embodiment of the present invention;

FIG. 6A illustrates a sectioned view of the drive shaft, and FIG. 6B illustrates an exemplary brake engaging at least one wheel, in accordance with an embodiment of the present invention;

Figure 1:
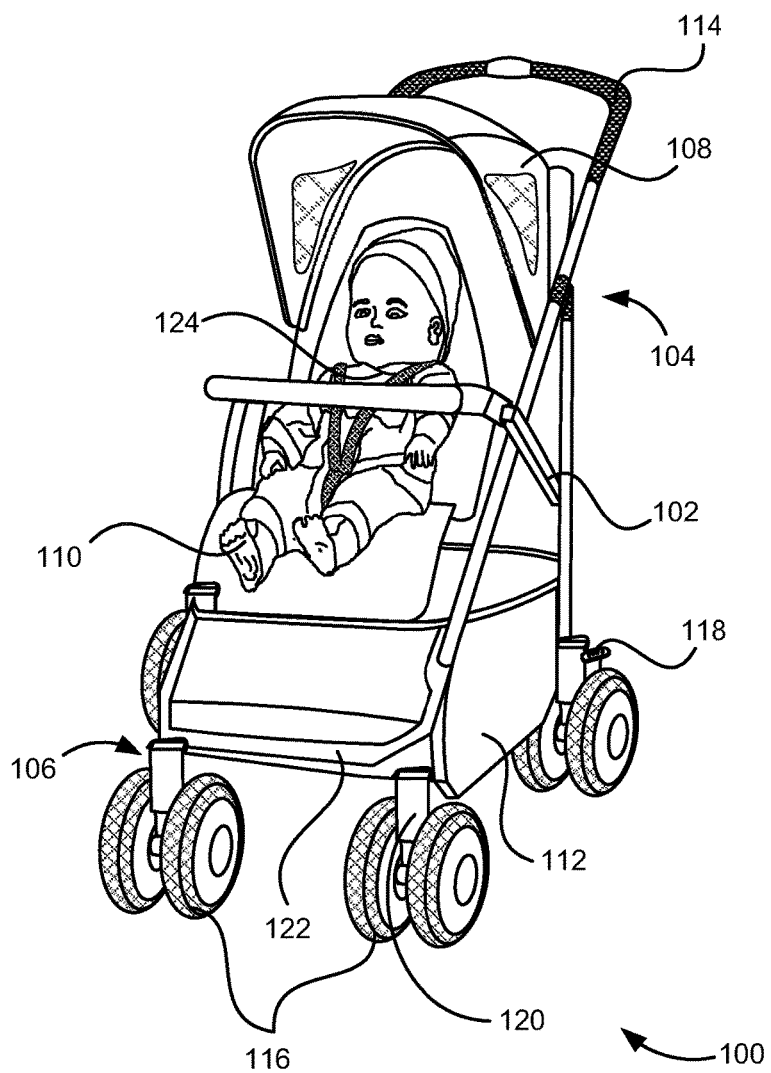
FIG. 1 illustrates a perspective view of an exemplary carrying apparatus in operation, carrying at least one item, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.,* Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye, Appeal No.* 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.,* 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See *Dana Corp.* v. *American Axle & Manufacturing, Inc.,* Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.,* 347 F.3d 1314, 1322 (Fed. Cir. 2003); *Epcon Gas Sys., Inc.* v. *Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp. v. Vaughan Co.,* 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp. v. Medtronic AVE, Inc.,* 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems v. Rockwood Retaining Walls, Inc.,* 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C. v. Vector Distrib. Sys., Inc.,* 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon,* 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc. v. Bauer Compressors, Inc.,* 279 F.3d 1022 (Fed. Cir. 2002) (construing the terms "substantially constant" and "substantially below"); *Zodiac Pool Care, Inc. v. Hoffinger Indus., Inc.,* 206 F.3d 1408 (Fed. Cir. 2000) (construing the term "substantially inward"); *York Prods., Inc. v. Cent. Tractor Farm & Family Ctr.,* 99 F.3d 1568 (Fed. Cir. 1996) (construing the term "substantially the entire height thereof"); *Tex. Instruments Inc. v. Cypress Semiconductor Corp.,* 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek,* 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp. v. Sollac,* 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp. v. Micron Separations, Inc.,* 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC v. Crane Cams Inc.,* 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In *Andrew Corp. v. Gabriel Elecs. Inc.,* 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc. v. Envirochem, Inc.,* 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc. v. Envirochem Inc.,* 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp. v. Micron Seps.,* 66 F.3d 1211, 1217, 36 USPQ2d 1225, 1229 (Fed. Cir. 1995); see, e.g., *Andrew Corp. v. Gabriel Elecs. Inc.,* 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory,* 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison,* 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of carrying apparatuses for carrying a baby and at least one item that may be provided by preferred embodiments of the present invention. In one embodiment of the present invention, a carrying apparatus may include a self-powered, rechargeable, technologically adaptable transport vehicle. The apparatus may include efficient seating and storage capacities for efficiently at least one item, such as a baby and pertinent baby supplies. Because the apparatus is self-powered, the physical stress of carrying at least one item is reduced. Furthermore, the apparatus uses technology to maintain perpetual power for operation, and to regulate and monitor the propulsion of the apparatus during transport.

In some embodiments, the apparatus may provide an efficient and easily operable self-powered vehicle that is efficacious for transporting and storing at least one item. The item may include, without limitation, a baby, a pet, diapers, baby milk, groceries, tools, food stuffs, and items that are commonly carried by baby strollers. The apparatus may be pushed or pulled in multiple directions and at varying velocities. The apparatus includes braking and accelerating capacities.

In some embodiments, the apparatus may utilize a motor portion that actuates propulsion of the apparatus on at least two wheels. The motor portion may utilizes a drive shaft that puts the motor portion and the at least one wheel in communication. The drive shaft is configured to ensure uniform acceleration and velocity during movement. A brake portion is controlled by a brake lever and also utilizes a parking brake on each wheel to compensate for the loaded weight on the apparatus.

In some embodiments, the apparatus may include a motor for powering the apparatus. The motor may include an electrical motor, and be charged by a power source, such as a rechargeable battery. The apparatus is also technologically adaptable, having a control portion that is in communication with the motor, a power switch, a speed regulator, and a rechargeable battery. A power cable and a USB cable may be adaptable to transport power and data to and from the control portion through a port.

In some embodiments, the apparatus may include a frame to provide structural support. The frame portion comprises an upper section and a lower section. The lower section is proximal to the ground surface and comprises four axle corners configured to join with at least one wheel each. The upper section may include a canopy for providing shade to the at least one item. The frame portion is configured to enable carrying and storage of at least one item, including a baby. In one embodiment, the frame portion includes a substantially stroller-type vehicle.

In some embodiments, the apparatus may include a seat portion. The seat portion is configured to enable carrying at least one item, such as the baby. The seat portion may be disposed at the upper section of the frame portion. The apparatus may further include a storage portion. The storage portion is configured to enable storing at least one item, such as baby supplies, at the lower section of the frame portion.

In some embodiments, the apparatus may include a handle portion. The handle portion is configured to enable orientation of the apparatus in at least one direction. In one embodiment, the handle portion comprises a substantially U-shaped, padded grip that extends from the upper section. A console tray may join with the handle portion. A storage shelf may be integrated into the console tray, facing rearward from the frame portion. The storage shelf may be used to store a communication device, keys, and the like.

In some embodiments, the apparatus may include at least one wheel. The at least one wheel may be disposed in the lower section of the frame portion. In one embodiment, the at least one wheel comprises two wheels at each axle corner, totaling eight wheels. In some embodiments, the apparatus may include at least one brake. The at least one brake is configured to engage said at least one wheel for at least partially reducing a velocity of the apparatus during motion. The at least one brake may be regulated with a brake lever that extends from the handle portion.

In some embodiments, the apparatus may include a motor portion. The motor portion is configured to actuate propulsion of the apparatus. The motor may include a rechargeable electric motor. In some embodiments, the apparatus may include a drive shaft. The drive shaft is configured to enable communication between the motor portion and the at least one wheel. In some embodiments, the apparatus may include a rechargeable power source. The rechargeable power source is configured to at least partially power the motor portion and/or said control portion.

In some embodiments, the apparatus may include a control portion. The control portion is configured to regulate the motor portion and the at least one brake. An accelerator lever and a brake lever may be used to perform this function. The control portion comprises a display portion. The display portion is configured to monitor a velocity of the apparatus during motion. The display portion also monitors power content of the rechargeable power source. In some embodiments, the apparatus may include a port. The port is configured to enable exchange of data and reception of power for recharging the rechargeable power source. The port is further configured to receive a power cable and a USB cable.

In one possible embodiments, the apparatus may include a motorized stroller powered by a rechargeable battery. The motorized stroller has seating for a child and expandable cargo area for many goods. A digital touchscreen controls the maximum top speed setting and also serves to monitor remaining battery life. Both sets of rear wheels are powered by a motor to ensure smooth take off and even propulsion. Furthermore, the stroller provides child transportation but also acts as a miniature shopping cart for today's busy parents/caregivers who must take their child with them on outings.

FIG. 1 illustrates a perspective view of an exemplary carrying apparatus in operation, carrying at least one item, in accordance with an embodiment of the present invention. In one aspect, a carrying apparatus 100 may include a self-powered, rechargeable, technologically adaptable transport vehicle for carrying and storing at least one item.

The apparatus may include efficient seating and storage capacities for efficiently at least one item 124, such as a baby and pertinent baby supplies. Because the apparatus is self-powered, the physical stress of carrying at least one item is reduced. Furthermore, the apparatus uses technology to maintain perpetual power for operation, and to regulate and monitor the propulsion of the apparatus during transport.

In one possible embodiments, the apparatus may include a motorized stroller powered by a rechargeable battery. The motorized stroller has seating for a child and expandable cargo area for many goods. A digital touchscreen controls the maximum top speed setting and also serves to monitor remaining battery life. Both sets of rear wheels are powered by a motor to ensure smooth take off and even propulsion. Furthermore, the stroller provides child transportation but also acts as a miniature shopping cart for today's busy parents/caregivers who must take their child with them on outings. However, in other embodiments, the apparatus may take other shapes and carry other items and types and sizes of people and animals.

In some embodiments, the apparatus may provide an efficient and easily operable self-powered vehicle that is efficacious for transporting and storing at least one item. The item may include, without limitation, a baby, a pet, diapers, baby milk, groceries, tools, food stuffs, and items that are commonly carried by baby strollers. The apparatus may be pushed or pulled in multiple directions and at varying velocities. The apparatus includes braking and accelerating capacities.

In some embodiments, the apparatus may utilize a motor portion that actuates propulsion of the apparatus on at least one wheel 116. The motor portion may utilizes a drive shaft that puts the motor portion and the at least one wheel in communication. The drive shaft is configured to ensure uniform acceleration and velocity during movement. At least one brake 118 is controlled by a brake lever and also utilizes a parking brake on each wheel to compensate for the loaded weight on the apparatus when the apparatus is stopped.

In some embodiments, the apparatus may include a motor portion for powering the apparatus. The motor may include an electrical motor, and be charged by a rechargeable power source, such as a lithium polymer rechargeable battery. However, in other embodiments, the rechargeable power source may include a solar panel. The apparatus is also technologically adaptable, having a control portion that is in communication with the motor, a power switch, a speed regulator, and a rechargeable battery. A power cable and a USB cable may be adaptable to transport power and data to and from the control portion through a port.

In some embodiments, the apparatus may include a frame portion 102 to provide structural support. Suitable materials for the frame portion may include, without limitation, aluminum, metal alloys, and rigid polymers. The frame portion comprises an upper section 104 and a lower section 106. The lower section is proximal to the ground surface and, in one embodiment, comprises four axle corners 120 configured to join with at least one wheel each.

In some embodiments, a footrest 122 may position along one edge of the lower section to provide a secure surface for resting the feet. The upper section may include a canopy 108 for providing shade to the at least one item. The frame portion is configured to enable carrying and storage of at least one item, including a baby. In one embodiment, the frame portion includes a substantially stroller-type vehicle.

In some embodiments, the apparatus may include a seat portion 110. The seat portion is configured to enable carrying at least one item, such as the baby. The seat portion may be disposed at the upper section of the frame portion. In one embodiment, the seat portion comprises a cushioned seat with a five-point seat belt buckle. The apparatus may further include a storage portion 112. The storage portion is configured to enable storing at least one item, such as baby supplies, at the lower section of the frame portion. The storage portion may include an expandable mesh cargo container. In one embodiment, the storage portion comprises a see-through mesh side wall and a ridged front and back wall as well as the floor. The mesh sidewalls may allow the storage portion to expand to hold many items.

In some embodiments, the apparatus may include a handle portion 114. The handle portion is configured to enable orientation of the apparatus in at least one direction. In one embodiment, the handle portion comprises a substantially U-shaped, padded grip that extends from the upper section. The console tray may join with the handle portion. A storage shelf may be integrated into the console tray, facing rearward from the frame portion. The storage shelf may be used to store a communication device, keys, and the like.

In some embodiments, the apparatus may include at least one wheel. The at least one wheel may be disposed in the lower section of the frame portion. In one embodiment, the at least one wheel comprises two wheels at each axle corner, totaling eight wheels. However, in other embodiments, more or less wheels may be used with the apparatus. In some embodiments, all wheels or only those on the front axle of the may swivel.

In some embodiments, the apparatus may include at least one brake. The at least one brake is configured to engage said at least one wheel for at least partially reducing a velocity of the apparatus during motion. The at least one brake may be regulated with a brake lever that extends from the handle portion. The types of brakes that may be used, may include, without limitation, caliper brakes, disc brakes, drum brakes, drag brakes and coaster brakes.

Figure 2A:
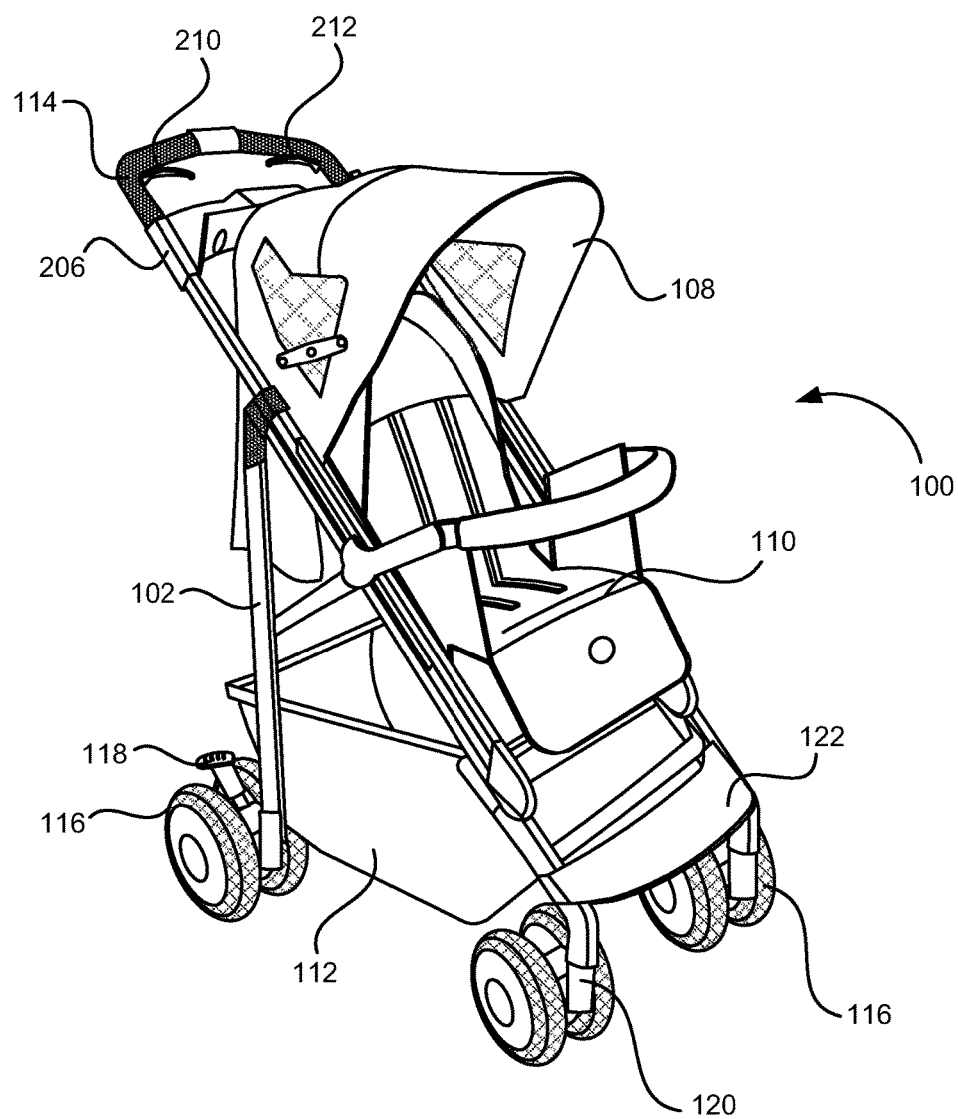
FIGS. 2A and 2B illustrates perspective views of the carrying apparatus, where
Figure 2B:
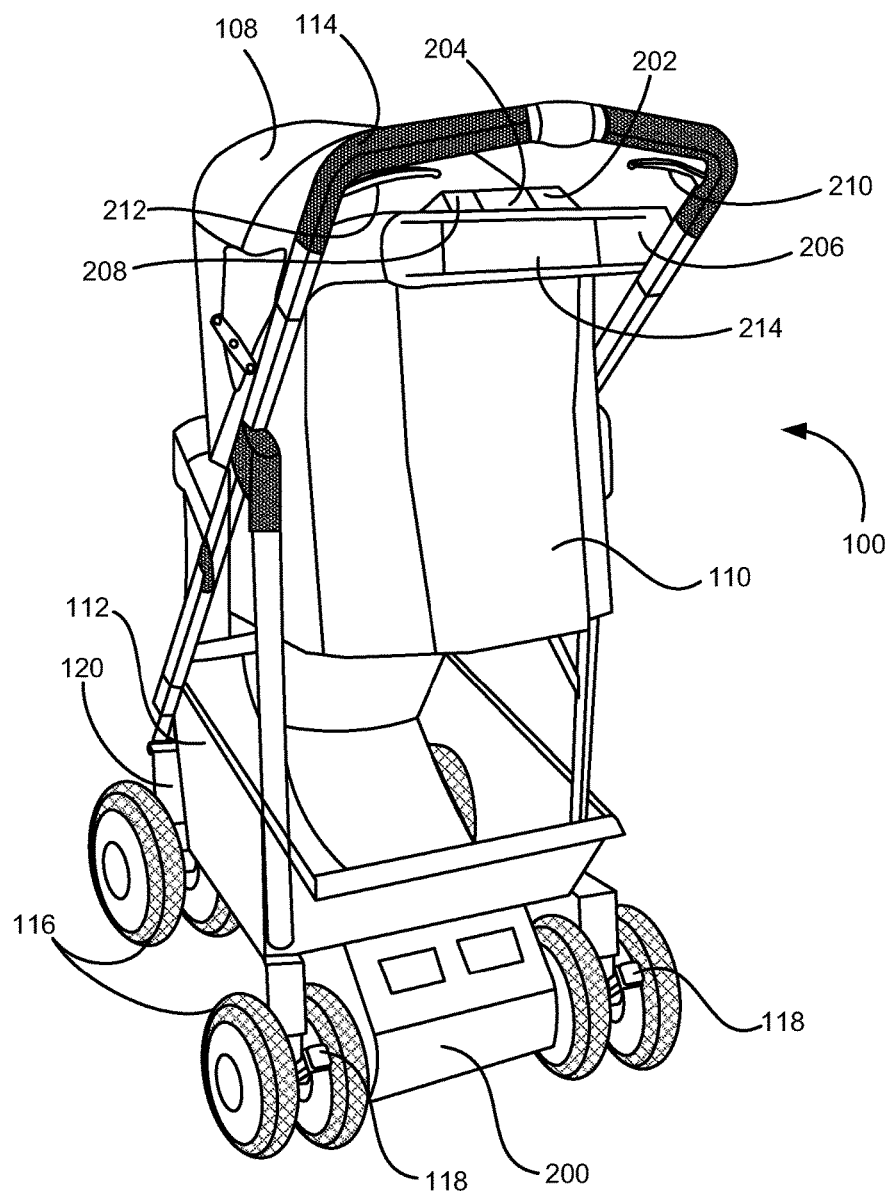

FIGS. 2A and 2B illustrates perspective views of the carrying apparatus, where FIG. 2A illustrates a frontal view, and FIG. 2B illustrates a rear view, in accordance with an embodiment of the present invention. In one aspect, the apparatus may include a motor portion 200. The motor portion is configured to actuate propulsion of the apparatus. The motor may include a rechargeable electric motor. In some embodiments, the apparatus may include a drive shaft. The drive shaft is configured to enable communication between the motor portion and the at least one wheel. In some embodiments, the apparatus may include a rechargeable power source. The rechargeable power source is configured to at least partially power the motor portion and/or said control portion.

In some embodiments, the apparatus may include a control portion 202. The control portion is configured to regulate the motor portion and the at least one brake. In one embodiment, the control portion comprises a display portion. The display portion may include a digital touchscreen located on top surface of the console tray. The display portion may be oriented to face a user pushing the apparatus.

In some embodiments, an accelerator lever and a brake lever may be used to perform this function. The control portion comprises a display portion 204. The display portion is configured to monitor a velocity of the apparatus during motion. The display portion also monitors power content of the rechargeable power source. The control portion may further include a power switch 208 to actuate the motor portion. At the handle portion, an accelerator lever 210 may be depressed to increase the velocity of the apparatus. Conversely, a brake lever 212 may be used to actuate the at least one brake on the wheels.

It is significant to note that the acceleration lever controls the take off and speed of the apparatus. However, the velocity regulator on the display portion controls the top speed of the apparatus. Consequently, even if the acceleration lever is pulled all the way back the apparatus will only go as fast as the maximum speed set on the velocity regulator. Furthermore, both sets of rear wheels may feature a parking brake that can be engaged and released by the foot of the user. There may be a parking brake on each wheel to compensate for the loaded-weight of the stroller. In some embodiments, the brake features a deep texture to ensure a foot does not slip without full engagement. Thus, the deep texture is provided for safety.

In some embodiments, a console tray 206 may be positioned proximally to the control portion, attached to the handle portion. The console tray may include at least one depression for receiving a liquid container. The console tray may have a rearwardly disposed storage shelf 214 that is configured to retain personal objects, such as communication devices, keys, wallets, and the like.

Figure 3:
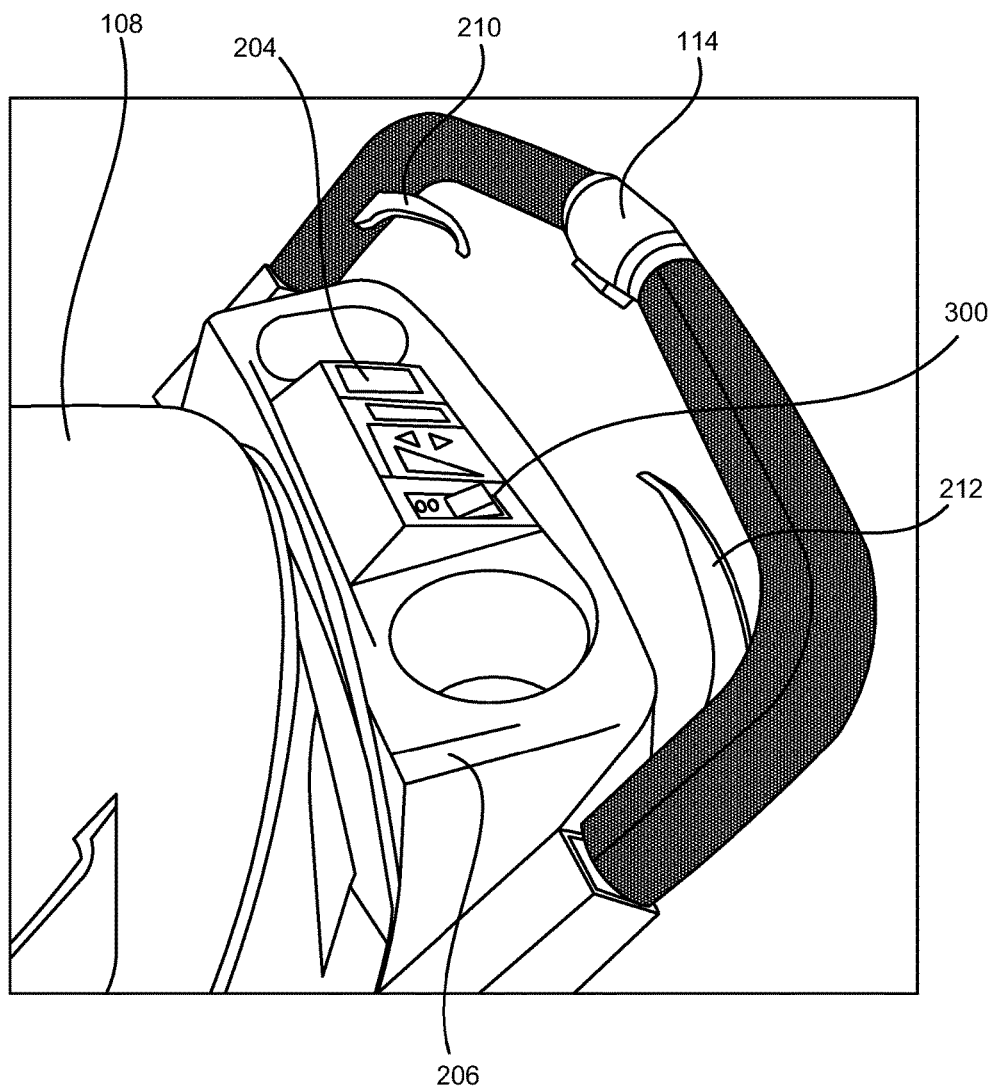
FIG. 3 illustrates an upper angle view of an exemplary handle portion and control portion of the carrying apparatus, in accordance with an embodiment of the present invention.

FIG. 3 illustrates an upper angle view of an exemplary handle portion and control portion of the carrying apparatus, in accordance with an embodiment of the present invention.

In one aspect, the handle portion is configured to enable orientation of the apparatus in at least one direction. In one embodiment, the handle portion comprises a substantially U-shaped, padded grip that extends from the upper section. The console tray may join with the handle portion.

Figure 4:
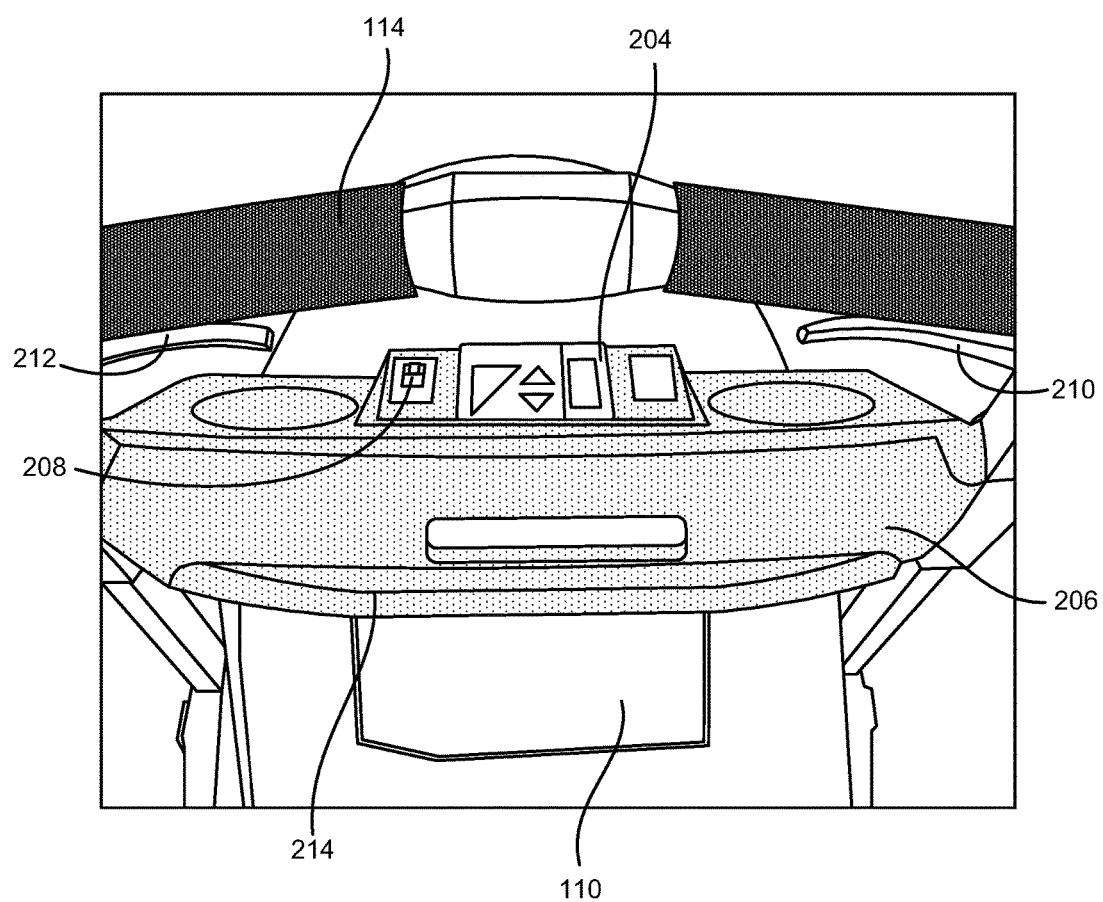
FIG. 4 illustrates a rearward view of an exemplary handle portion and control portion of the carrying apparatus, carrying at least one item, in accordance with an embodiment of the present invention.

FIG. 4 illustrates a rearward view of an exemplary handle portion and control portion of the carrying apparatus, carrying at least one item, in accordance with an embodiment of the present invention. In one aspect, the control portion comprises a power switch. The power switch may be used to control the overall power of the device. If the power switch is off the powered features, including the display portion and the motor portion are nonoperational. The power switch must be own to operate any of the powered features. The power switch may further actuate an illumination. The illumination occurs when the power switch is powered on to ensure there is no accidental pulling of the accelerator lever before the user is ready for the apparatus to move.

Figure 5A:
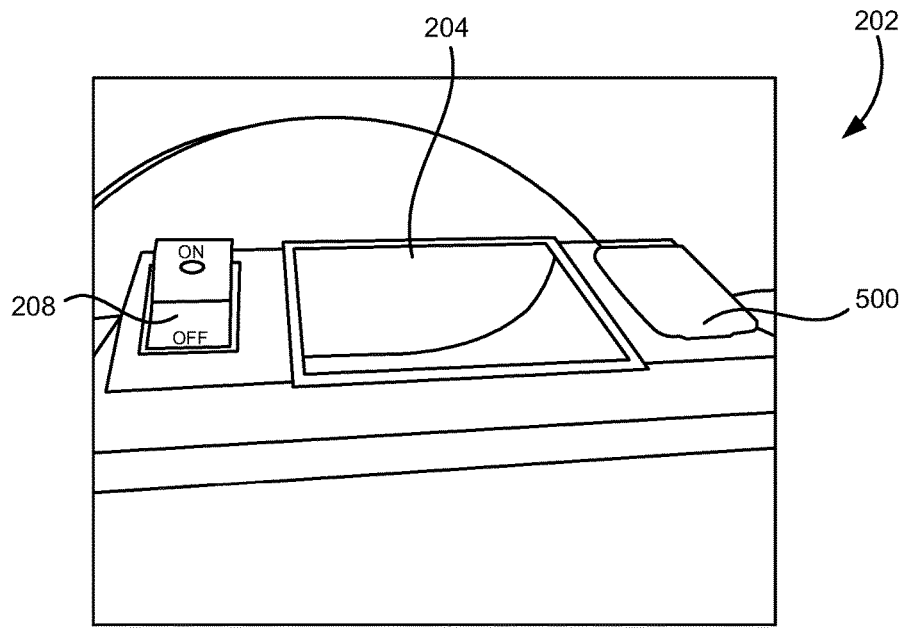
FIGS. 5A and 5B illustrates perspective views of the control portion, where
Figure 5B:
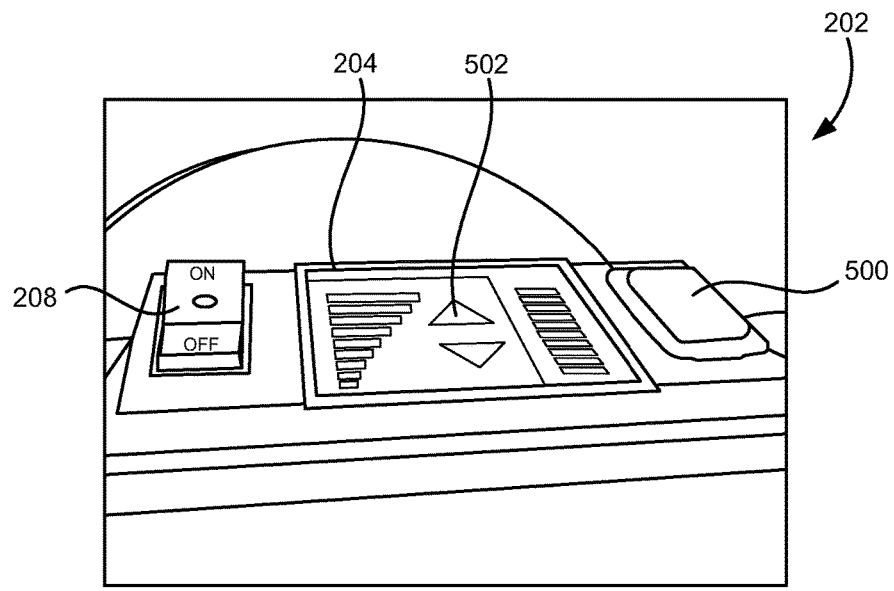

FIGS. 5A and 5B illustrates perspective views of the control portion, where FIG. 5A illustrates the control portion powered off, and FIG. 5B illustrates the control portion powered on with the display portion operational, in accordance with an embodiment of the present invention. In one aspect, the apparatus may include a port 500. The port is configured to enable exchange of data and reception of power for recharging the rechargeable power source.

In some embodiments, the control portion comprises a display portion. The display portion may include a digital touchscreen interface. This type of interface may be easily accessible while operating the apparatus. The display portion is configured to monitor a velocity of the apparatus during motion. A velocity regulator 502 on the display portion may be used to increase or decrease the velocity of propulsion. The display portion also monitors power content of the rechargeable power source.

Figure 6A:
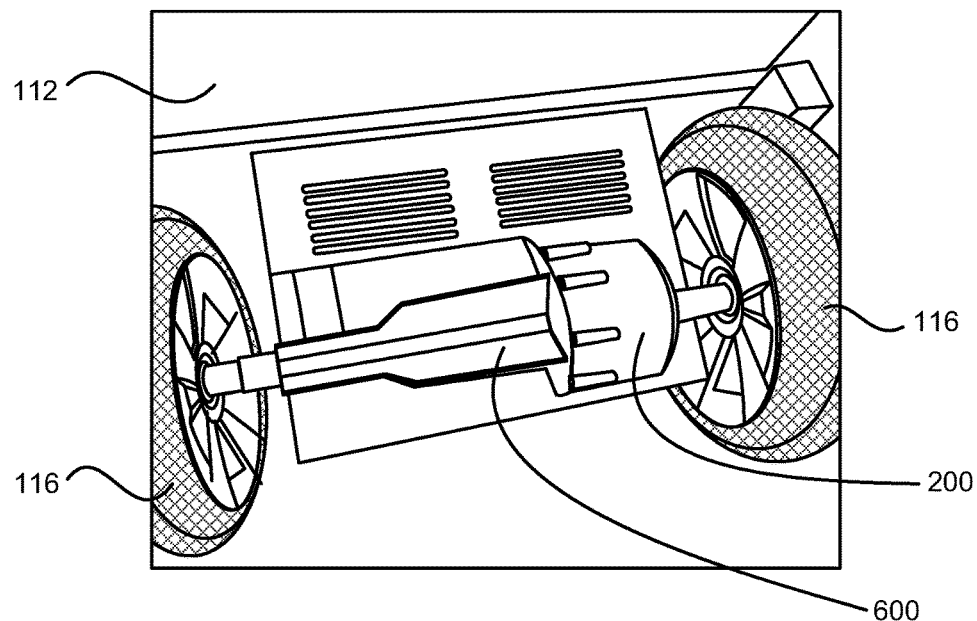
FIGS. 6A and 6B illustrates close-up perspective views of an exemplary motor portion, where
Figure 6B:
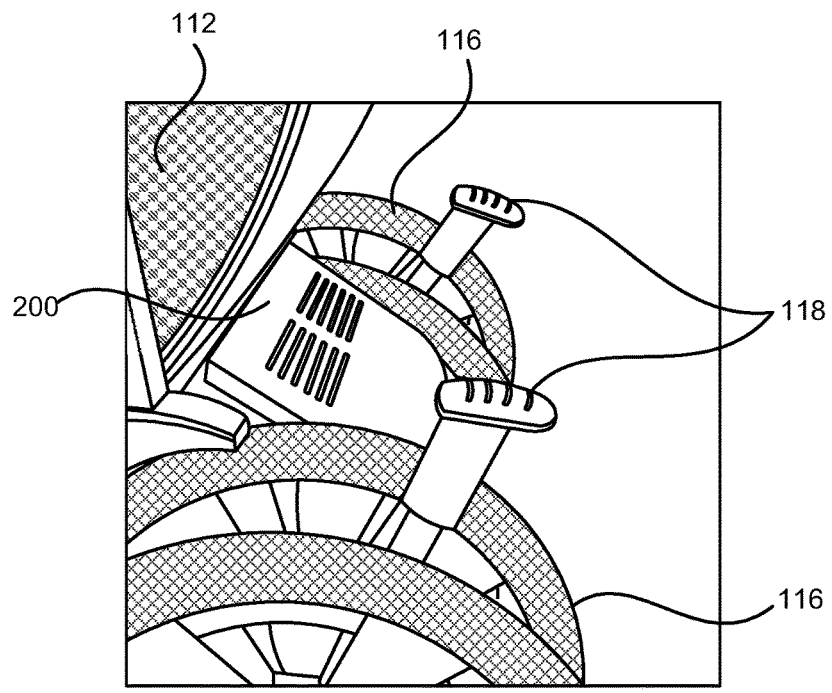

FIGS. 6A and 6B illustrates close-up perspective views of an exemplary motor portion, where FIG. 6A illustrates a sectioned view of the drive shaft, and FIG. 6B illustrates an exemplary brake engaging at least one wheel, in accordance with an embodiment of the present invention. In one aspect, the apparatus may include a drive shaft 600. The drive shaft is configured to enable communication between the motor portion and the at least one wheel. In one embodiment, the drive shaft engages both sets of rear wheels to ensure even take off and propulsion of the apparatus. Those skilled in the art will recognize that the apparatus is designed to carry a child and many items to basically act as a miniature shopping cart. Therefore, the apparatus may be heavy. To compensate for this weight both sets of rear wheel must be powered by the motor portion.

Figure 7:
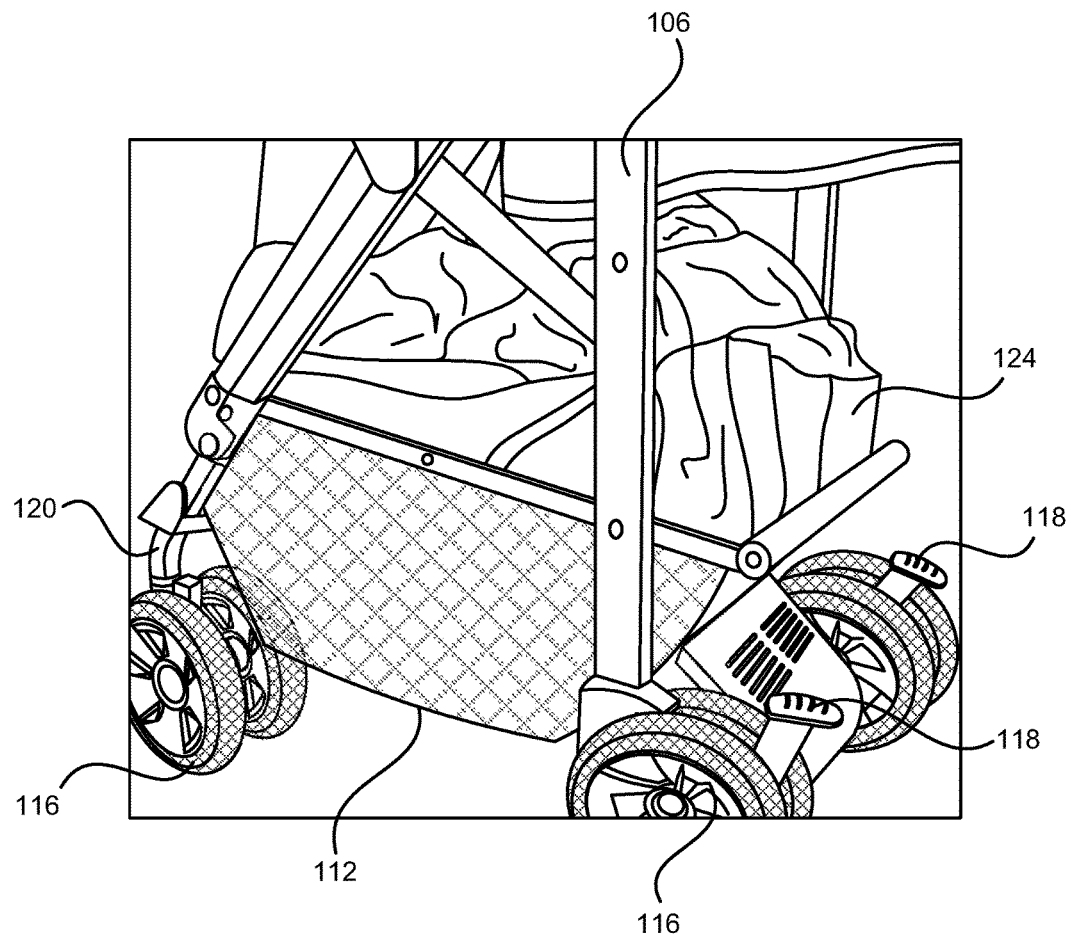
FIG. 7 illustrates a close-up perspective view of an exemplary storage portion carrying at least one item, in accordance with an embodiment of the present invention.

FIG. 7 illustrates a close-up perspective view of an exemplary storage portion carrying at least one item, in accordance with an embodiment of the present invention. In one aspect, the storage portion may include an expandable mesh cargo container. In one embodiment, the storage portion comprises a see-through mesh side wall and a ridged front and back wall as well as the floor. The mesh sidewalls may allow the storage portion to expand to hold many items. Those skilled in the art will recognize that since the storage portion is see-through, the contents are more easily visible and accessible.

Figure 8:
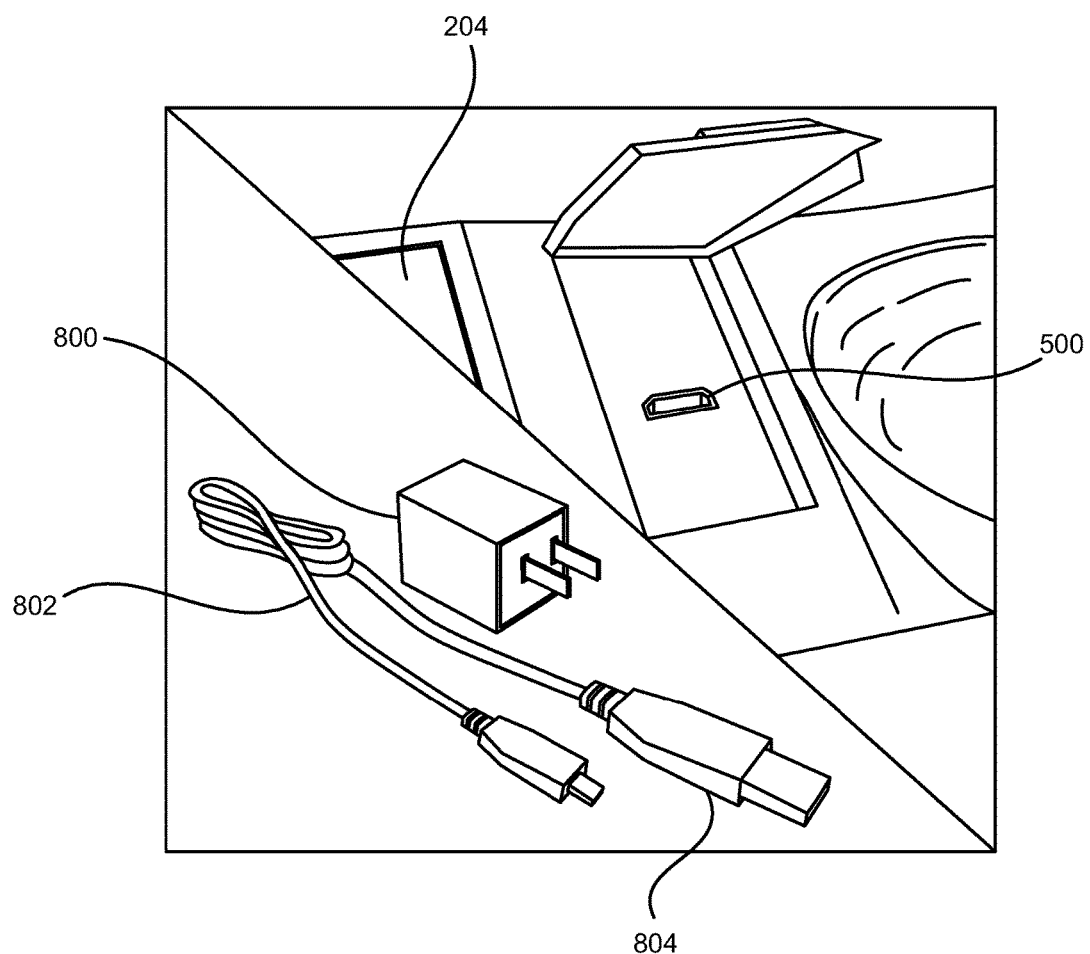
FIG. 8 illustrates a close-up perspective view of an exemplary port and an exemplary power cable, in accordance with an embodiment of the present invention.

FIG. 8 illustrates a close-up perspective view of an exemplary port and an exemplary power cable and data cable, in accordance with an embodiment of the present invention. In one aspect, the apparatus may include a port. The port is configured to enable exchange of data and reception of power for recharging the rechargeable power source. The port is further configured to receive a power cable 800 and a data cable. The data cable 802 may include a USB cable with a USB jack 804. In one embodiment, a user may plug the power cable into the port and then engage the USB end of the data cable with a USB port of the apparatus to charge the rechargeable power source.

In one alternative embodiment, many of the features of the apparatus may be used for other generally manual vehicles, including, without limitation, a wheel barrel, a push cart, a wheelchair, and a wagon. In another alternative embodiment, the rechargeable powered source is a solar panel. In yet another alternative embodiment, the wheels are replaced with skis or rails. In yet another alternative embodiment, the apparatus may include a powered adult walker, allowing disabled or physically-limited adults to use their walkers to transport weighted or sizable objects.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing a self-powered apparatus for carrying and storing babies and baby related items according to the present invention will be apparent to those skilled in the art. Various aspects of the invention have been described above by way of illustration, and the specific embodiments disclosed are not intended to limit the invention to the particular forms disclosed. The particular implementation of the self-powered apparatus for carrying and storing babies and baby related items may vary depending upon the particular context or application. By way of example, and not limitation, the a self-powered apparatus for carrying and storing babies and baby related items described in the foregoing were principally directed to a baby stroller that is self-powered, easily operable, and has copious storage capacity; however, similar techniques may instead be applied to floatation devices, whereby air bladders can be used alongside the water bladders, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a frame portion, said frame portion comprising an upper section and a lower section, said frame portion configured to enable carrying and storage;
   a seat portion, said seat portion configured to enable carrying at least one item;
   a storage portion, said storage portion configured to enable storing said at least one item;
   a handle portion, said handle portion configured to enable orientation of said apparatus in at least one direction;
   at least one wheel, said at least one wheel disposed in said lower section of said frame portion;
   at least one brake, said at least one brake configured to engage said at least one wheel for at least partially reducing a velocity;
   a motor portion, said motor portion configured to actuate propulsion of said apparatus;
   a drive shaft, said drive shaft configured to enable communication between said motor portion and said at least one wheel;
   a control portion, said control portion configured to regulate said motor portion and said at least one brake, said control portion comprising a display portion, said display portion configured to monitor a velocity of said apparatus, said control portion further configured to monitor said rechargeable power source;
   a rechargeable power source, said rechargeable power source configured to at least partially power said motor portion and/or said control portion; and
   a port, said port configured to enable exchange of data, said port further configured to enable reception of power for recharging said rechargeable power source.

2. The apparatus of claim 1, in which said apparatus comprises substantially a stroller-type vehicle.

3. The apparatus of claim 2, wherein said seat portion is disposed to position in said upper section of said frame.

4. The apparatus of claim 3, in which said seat portion comprises a cushioned seat with a five-point seat belt buckle.

5. The apparatus of claim 4, wherein said storage portion is disposed to position in said lower section of said frame.

6. The apparatus of claim 5, in which said storage portion comprises an expandable mesh cargo container.

7. The apparatus of claim 6, wherein said handle portion is disposed to project from said upper section of said frame.

8. The apparatus of claim 7, in which said handle portion comprises a substantially U-shaped grip.

9. The apparatus of claim 8, in which said handle portion comprises a console tray, said console tray comprising at least one depression configured to at least partially receive a drink container.

10. The apparatus of claim 9, in which said at least one wheel comprises eight axle wheels.

11. The apparatus of claim 10, in which said at least one brake comprises four disc brakes.

12. The apparatus of claim 11, wherein said at least one brake is regulated through a brake lever, said brake lever disposed at said handle portion.

13. The apparatus of claim 12, in which said motor portion comprises an electrical motor.

14. The apparatus of claim 13, in which said upper section of said frame portion comprises a canopy.

15. The apparatus of claim 14, in which said display portion comprises a digital touchscreen interface.

16. The apparatus of claim 15, in which the digital touchscreen interface comprises a velocity regulator.

17. The apparatus of claim 16, in which said port comprises an external USB port.

18. The apparatus of claim 17, wherein said port is configured to mate with a power cord and a USB jack.

19. An apparatus consisting of:
- a frame portion, said frame portion comprising an upper section and a lower section, said frame portion configured to enable carrying and storage;
- a seat portion, said seat portion configured to enable carrying at least one item, said seat portion disposed to position in said upper section of said frame portion, said seat portion comprising a cushioned seat with a five-point seat belt buckle;
- a storage portion, said storage portion configured to enable storing said at least one item, said storage portion disposed to position in said upper section of said frame, said storage portion comprising an expandable mesh cargo container;
- a handle portion, said handle portion configured to enable orientation of said apparatus in at least one direction, said handle portion comprising a substantially U-shaped grip;
- a console tray, said console tray comprising at least one depression configured to at least partially receive a drink container;
- at least one wheel, said at least one wheel disposed in said lower section of said frame, said at least one wheel comprising eight axle wheels;
- at least one brake, said at least one brake configured to engage said at least one wheel for at least partially reducing a velocity, said at least one brake configured to be regulated through a brake lever, said brake lever disposed at said handle portion;
- a motor portion, said motor portion configured to actuate movement of said apparatus;
- a drive shaft, said drive shaft configured to enable communication between said motor portion and said at least one wheel;
- a control portion, said control portion configured to regulate said motor portion and said at least one brake, said control portion comprising a display portion, said display portion configured to monitor a velocity of said apparatus, said control portion further configured to monitor said rechargeable power source, said display portion comprising a digital touchscreen interface;
- a rechargeable power source, said rechargeable power source configured to at least partially power said motor portion and/or said control portion; and
- a port, said port configured to enable exchange of data, said port further configured to enable reception of power for recharging said rechargeable power source, said port comprising an external USB port.

* * * * *